Figure 1:
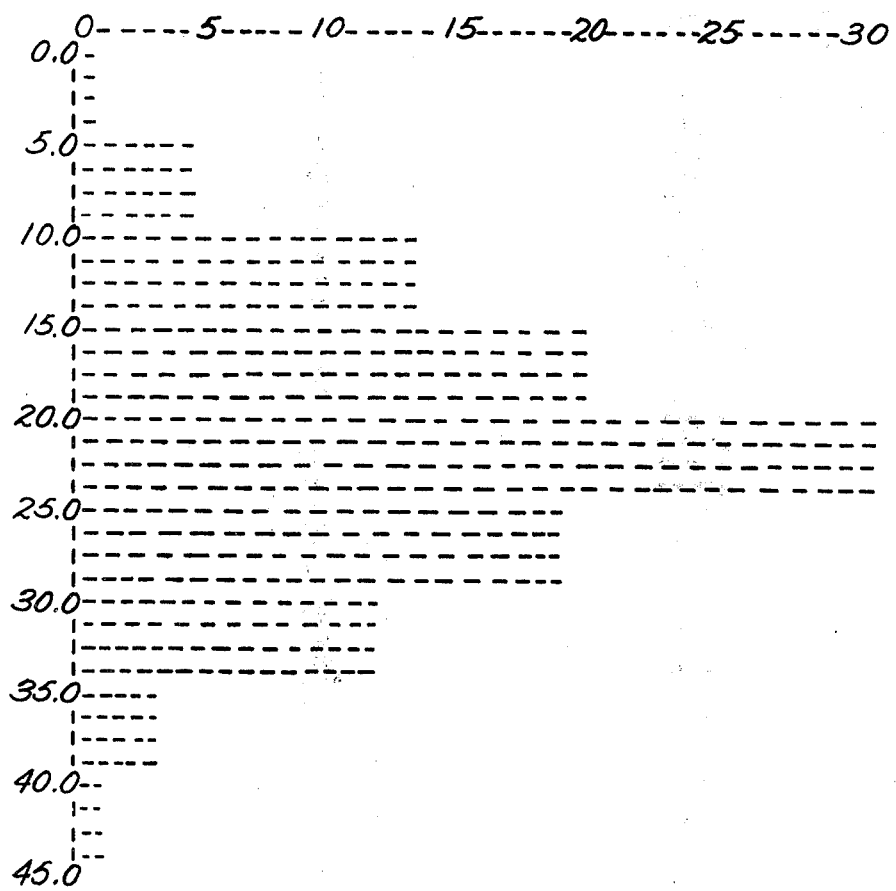

United States Patent [19]
Gillan et al.

[11] 4,124,548
[45] Nov. 7, 1978

[54] MAR-RESISTANT PAINTS

[75] Inventors: John Gillan, Langwarrin; Frederick J. Lubbock, Beaumaris, both of Australia

[73] Assignee: Dulux Australia Ltd., Melbourne, Australia

[21] Appl. No.: 785,298

[22] Filed: Apr. 6, 1977

Related U.S. Application Data

[63] Continuation-in-part of Ser. No. 768,627, Feb. 14, 1977, abandoned, which is a continuation-in-part of Ser. No. 569,744, Apr. 2, 1975, abandoned.

[30] Foreign Application Priority Data

May 1, 1974 [AU] Australia ................................ PB7409

[51] Int. Cl.² ........................ C09D 3/18; C09D 3/393; C09D 3/727
[52] U.S. Cl. .......................... 260/17 R; 260/29.6 NR; 260/29.6 RB
[58] Field of Search .............. 106/266, 19; 260/2.5 B, 260/17 R, 42.55, 29.6 NR, 29.6 RB, 29.4 R

[56] References Cited

U.S. PATENT DOCUMENTS

| | | | |
|---|---|---|---|
| 3,501,419 | 3/1970 | Bridgeford | 260/2.5 B |
| 3,725,089 | 4/1973 | Zola | 260/17.4 R |
| 3,839,253 | 10/1974 | Kershaw et al. | 260/29.6 NR |

*Primary Examiner*—Theodore Morris
*Attorney, Agent, or Firm*—Cushman, Darby & Cushman

[57] ABSTRACT

A matt paint which is mar-resistant is produced by the incorporation therein of polymer beads of two distinct size ranges, one range having diameters of from 2–10 micron and the other having diameters of from 10–40 micron, the total volume of beads comprising from 50–90% of the volume of the non-volatile content of the paint, and the beads of the larger size range comprising from 45–55% of the total bead volume. The reflectance of the paint is related to the size and the type of beads used.

2 Claims, 2 Drawing Figures

MAR-RESISTANT PAINTS

This is a continuation-in-part of prior U.S. application Ser. No. 768,627, filed Feb. 14, 1977 which in turn is a continuation-in-part of prior U.S. application Ser. No. 569,744 filed Apr. 2, 1975, both now abandoned.

This invention relates to matt paint compositions.

Matt paints have been produced for many years by utilizing relatively coarse inorganic extender particles to disrupt the surface of a dry paint film and thus produce a low surface gloss. Although many useful products of this type have been used successfully, it has come to be accepted that they have inherent limitations in respect of properties such as bittiness, stain removal and sheariness. It has also been observed that when the surface of such a paint film is abraded, exposed fragments of brittle extender pigment particles break away, leaving disfiguring, whitish streaks or even glossy patches in the abraded areas.

One proposed method of overcoming these defects is to replace the inorganic extender pigment particles with polymer beads of a similar diameter. Such a method is disclosed in, for example, Australian patent specification No. 434,658. It is well known in the art that, in this context, the word "diameter" is not being used in a strict sense. Polymer beads prepared by known methods will not be present in a single uniform size but in a range of sizes which can be represented graphically in a distribution curve; that is, a plot of particle size against frequency of occurrence of a given size in the range. A typical distribution curve has a bell shape (See for example, "Emulsions, theory and practice", by P. Becher (Reinhold, 2nd Edition, pages 53–56). There will naturally be slight variations in curve shape depending on the nature of the materials and on the processing conditions, but all distribution curves will be of the same basic bell shape. Such distributions are readily obtained by using commercially available equipment designed for fine particle measurement, such as a Coulter Counter. The "diameter" of the beads can then be "measured" according to practical requirements. It can be, for example, the maximum size of bead present (as measured visually in a microscope), or it can be one of the known and recognized average values (See, for example, "Chemical Engineer's Handbook" by Perry and Chilton (McGraw-Hill), 5th Edition, 8-4). Alternatively, a size range, defined by the microscopically measured maximum and minimum diameters, can be specified. It can readily be seen that, for a given sample of beads of, for example, maximum size 40 micron and minimum size 10 micron, the peak of the bell-shaped distribution curve (representing the most frequently occurring bead size in the sample) will be between the two extremes.

Paints utilizing such polymer beads are free from most of the defects of conventional matt paints and if the polymer beads used therein have prime pigment, for example, titanium dioxide, dispersed therein, they can exhibit unusually high opacity. We have, however, observed that the color range of paints of this type is limited by the tendency, especially in those shades having a low reflectance, for streakiness or slight variations in color to appear in the dry film, depending on the method used to apply the paint to a substrate.

We now have found that this problem can be overcome by the use of two separately produced sets of polymer beads which fall within two distinct size ranges, the first having diameters from 2–10$\mu$ and the second greater than 10 but not exceeding 40$\mu$, and each set having its own bell-shaped distribution curve of the type described above. It can readily be seen that a distribution curve of a combination of beads of these two size ranges would have two peaks and would thus be quite different from that of beads of a single size range of from 2 to 40$\mu$.

Futhermore, if the paint to be produced is to have a reflectance of greater than 65%, both types of beads must be white and opaque. If the reflectance is to be from 30 to 65%, the smaller beads must be white and opaque but the larger beads must be clear. At reflectances below 30%, both types of beads must be clear. The volume proportion of beads having a diameter greater than 10 and not exceeding 40$\mu$ must be from 45 to 55% of the total beads volume. The volume of beads relative to the total non-volatile content of the paint should be at least 55%, but not more than 90%, at which point the mar-resistance starts to deteriorate appreciably.

A particularly useful attribute of some of these compositions is that they have unusually high mar-resistance, for which purpose the larger beads should be solid; that is, they must be free of voids and preferably they should comprise polymer having a maximum elongation at break of 40%.

The matt paints to which we refer are conventional to the extent that they consist of liquid dispersions of opacifying, coloring and/or film-modifying pigments in paint vehicles. Dry films of the paint have a matt appearance. We use the expression "paint vehicles" in its broad, art-recognized sense of liquid film-forming compositions which, in turn, may consist of solutions or dispersions of film-forming polymer in volatile liquids. In accordance with established practice, we refer to the constituents of the liquid paint composition which persist in a dry film thereof as the non-volatile content of the paint. The composition of the paint vehicle is not incidental to the performance of this invention. It must not dissolve or chemically attack the polymer beads, but this is self-evident since, if it does so, they will no longer exist in the composition as beads. The only limitation in the choice of paint vehicle is, therefore, that it must be inert with respect to the beads to be incorporated therein. The paints may, if desired, comprise a proportion of inorganic extender pigment but, for the best results, we prefer to avoid the deliberate introduction into the paint of any conventional inorganic extenders since (in our experience) this predictably detracts from its performance.

By "reflectance" of a paint film, we mean the standard green reflectance measured with a tristimulus differential colorimeter and denoted "G" in the American Society for Testing and Materials Method D2244-68. The green filter reflectance is used regardless of the shade of the paint because of its close correlation with human vision (Gardner-Sward "Paint Testing Manual", 13th Edition, page 31).

The requirement to avoid color variations is of particular importance in formulating so-called tint bases, which are essentially paints of standard tinting strength to which controlled amounts of liquid tinter are added to produce a range of standard paint shades. In order to avoid the above-described undesirable appearance and formulating compromises, we have found it desirable in developing a so-called "universal tinting system", to use three tint bases. In the first of these all beads are white and opaque. In the second, beads in the smaller size range as defined above are white and opaque, but the larger beads are not and, in the third, none of the beads is opaque.

The tint base from which any particular shade is to be derived by the addition thereto of tinter is chosen as follows: For shades of reflectances above 65%, a tint base in which all beads are white and opaque is chosen; for shades with reflectances between 30% and 65%, a tint base in which the smaller beads only are white and opaque is used and, for shades with reflectances below 30%, a tint base in which all beads are clear should be used.

Bead diameters may be measured microscopically, but we have found it more convenient to use an instrument such as Coulter Counter for this purpose. It is accepted that, in any particular batch of beads, a minor proportion of them may lie outside of these nominal size ranges but such normal variation in quality can be tolerated in performing this invention.

Suitable polymer beads may be prepared by, for example, the polymerization of an emulsion in water of a syrup comprising polymerizable elements convertible to solid polymer, e.g. a solution in styrene of an unsaturated polyester. Other polymers which may be prepared in the form of beads by an emulsion technique include urea-formaldehyde condensates and methacrylic polymers.

White opaque beads may be prepared by similar methods, having first dispersed prime pigment, e.g. titanium dioxide, in the syrup of convertible elements before preparation of the emulsion in water. In general, at least 1% by weight of white pigment is required to impart opacity to the beads. The opaque nature of a bead is readily identified by examining it microscopically using transmitted illumination.

Alternatively, opacity may be imparted to the beads, at least in part, by forming in them a vesiculated structure. The vesicles may, in turn, comprise a proportion of pigment particles trapped therein. By a "vesiculated particle", we mean a particle comprising a plurality of discrete air sacs or vesicules encased in a shell of essentially non-porous polymer. Particles of this type are described in, for example, Australian patent specification No. 439,432.

Certain materials which are utilized in the examples given hereinunder are identified as follows:

| | |
|---|---|
| hydroxyethyl cellulose | Natrosol 250 H.R. or equivalent |
| poly(vinyl alcohol) | Gelvatol 20/90 or equivalent |
| unsaturated polyester resin | Crystic C/96 or equivalent |
| bactericide | Proxel T.L. or equivalent |
| styrene-maleic anhydride copolymer | S.M.A. 1440 ex Sinclair Petrochemicals, Inc. |

Natrosol, Gelvatol, Crystic and Proxel are trademarks.

Clear Bead Slurry, 10–40 microns

The slurry was prepared as follows:
To a solution of 0.33 parts of hydroxyethyl cellulose in 49.11 parts of water, 11.17 parts of a 7½% solution in water of an 80% hydrolyzed polyvinyl alcohol was added and stirred.

A solution of 30.83 parts of an unsaturated polyester resin and 1.12 parts of a 50% benzoyl peroxide paste in 5.10 parts of styrene was added to the above aqueous solution and mixed at high speed until the largest emulsion particle visible under a microscope was 40 micron diameter.

The emulsion was stirred slowly and 0.18 parts of diethyl aniline was added. The slow stirring was continued for three hours while polymerization of the emulsion particles occurred.

Upon completion of the polymerization, the pH of the emulsion was adjusted to 9 with approximately 0.15 parts of a 28% ammonia solution.

0.05 parts of a bactericide and 1.96 parts of an aqueous ammoniacal solution (pH 9.0) containing 35% of a styrene-maleic anhydride copolymer were added. The size range of the polymer beads so produced was estimated at 10–40 microns, and the size distribution curve as plotted by computer from Coulter Counter measurement data is as in the following Table and as shown in FIG. 1.

TABLE 1

| Particle diameter (Micron) | % by volume of particles larger than indicated particle diameter |
|---|---|
| 43.56 | 0.0 |
| 40 | 0.84 |
| 35 | 3.5 |
| 30 | 15 |
| 25 | 33 |
| 20 | 63 |
| 15 | 83 |
| 10 | 95 |
| 5 | 100 |

Clear Bead Slurry, 2–10 micron

The slurry was prepared as follows:
To a solution of 0.33 parts of hydroxyethyl cellulose in 35.11 parts of water, 11.17 parts of a 7½% solution in water of an 80% hydrolyzed polyvinyl alcohol was added and stirred.

A solution of 30.83 parts of an unsaturated polyester resin and 1.12 parts of a 50% benzoyl peroxide paste in 5.10 parts of styrene was added to the above aqueous solution and mixed at high speed until the largest emulsion particle visible under a microscope was 10 micron diameter.

The emulsion was stirred slowly and 14 parts of water and 0.18 parts of diethyl aniline were added. The slow stirring was continued for three hours while polymerization of the emulsion particles occurred.

Upon completion of polymerization, the pH of the emulsion was adjusted to 9 with approximately 0.15 parts of a 28% ammonia solution.

0.05 parts of a bactericide and 1.96 parts of an aqueous ammoniacal solution (pH 9.0) containing 35% of a styrene-maleic anhydride copolymer were added.

Figure 2:
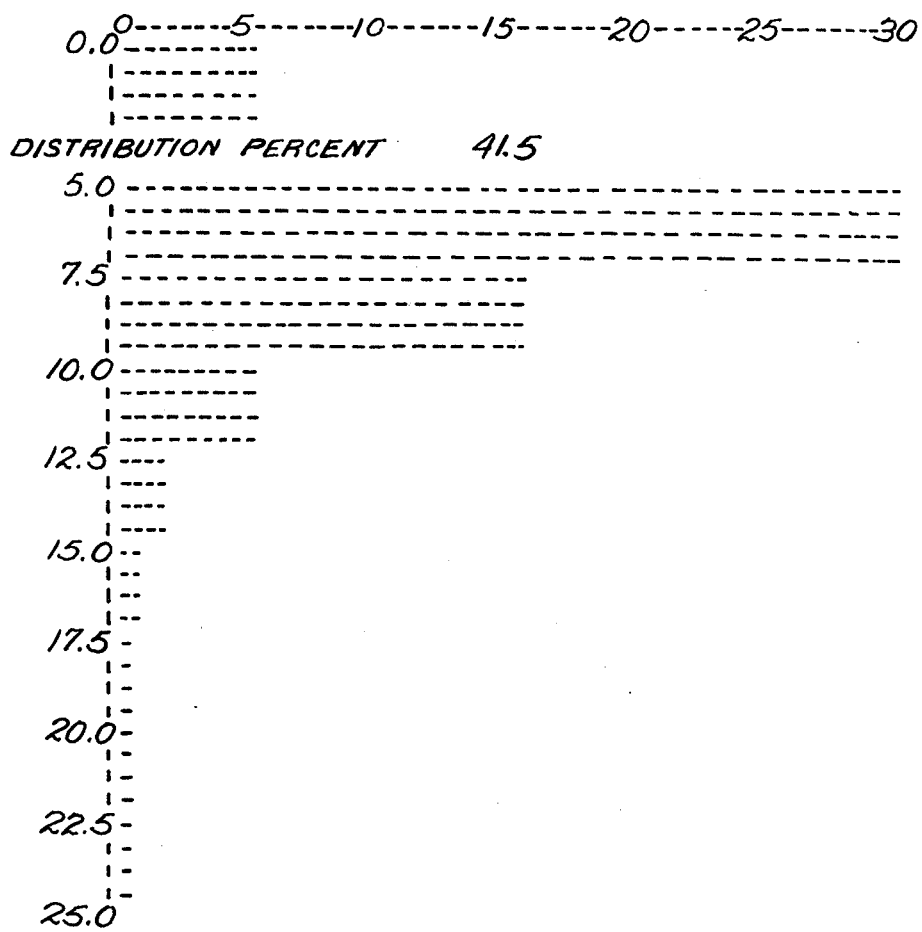

The size range of the polymer beads so produced was estimated to be 2–10 micron and the size distribution curve plotted by computer from Coulter Counter data is as in the following table and as shown in FIG. 2.

TABLE II

| Particle diameter (micron) | % by volume of particles larger than indicated particle diameter |
|---|---|
| 26.84 | 0.0 |
| 22.5 | 0.4 |
| 20 | 0.64 |
| 17.5 | 0.9 |
| 15 | 1.84 |
| 12.5 | 3.36 |
| 10 | 8.69 |
| 7.5 | 24 |
| 5 | 53 |

TABLE II-continued

| Particle diameter (micron) | % by volume of particles larger than indicated particle diameter |
|---|---|
| 2.5 | 94 |

In FIG. 2, the percentage of beads in the 2.5–5.0 range was so great that it exceeded the scale on the ordinate, and the actual figure was printed. It is immediately apparent from a comparison of this size distribution curve with that for the 10–40 that the two bead slurries are vastly different; there is, naturally, a very slight overlap of sizes but for all practical purposes, they are completely differentiated and, when mixed, a size distribution curve of the mixture would have two peaks. It would, therefore, be quite different from any normal distribution.

White Bead Slurry, 10–40 micron

The slurry was prepared as follows:

A solution of 8.51 parts of a 2.5% hydroxyethyl cellulose solution and 8.51 parts of a 7.5% solution of an 80% hydrolyzed polyvinyl alcohol in 35.70 parts of water was formed. 16.20 parts of a rutile titanium dioxide pigment was dispersed by high speed mixing to fineness of less than 2 micron Hegmann in a solution of 23.50 parts of an unsaturated polyester in 3.70 parts of styrene. A mixture of 0.85 parts of a 50% benzoyl peroxide paste and 1.02 parts of divinyl benzene was added to the above dispersion. The resulting mixture was added to the above aqueous solution and mixed at high speed until the largest emulsion particle visible under a microscope was 40 micron.

The emulsion was then stirred slowly and 0.22 parts of diethyl aniline was added. The slow stirring was continued for one hour while polymerization of the emulsion particles occurred.

Upon completion of the polymerization, the pH of the emulsion was adjusted to 9 with approximately 0.12 parts of a 28% ammonia solution.

0.04 parts of a bactericide and 1.58 parts of an aqueous ammoniacal solution (pH 9.0) containing 35% of a styrene-maleic anhydride copolymer were added.

The size range of the polymer beads so produced was estimated to be 10–40 micron and the size distribution curve was identical to FIG. 1.

White Bead Slurry, 2–10 micron

A solution of 9.20 parts of a 2.5% hydroxyethylcellulose solution and 13.80 parts of a 7.5% solution of a 80% hydrolyzed poly(vinyl alcohol) in 18.50 parts of water was formed.

14.80 parts of a rutile titanium dioxide pigment was dispersed by high speed mixing to a fineness of less than 2 micron Hegmann in a solution of 21.30 parts of an unsaturated polyester resin in 3.40 parts of styrene. 0.75 parts of a 50% benzoyl peroxide paste was added to this dispersion. The resulting mixture was added to the above aqueous solution and mixed at high speed until the largest particle visible under a microscope was 10 micron.

The emulsion was then stirred slowly and 15.70 parts of water and 0.18 parts of diethylaniline were added. The slow stirring was continued for one hour while polymerization of the emulsion particles occurred.

Upon completion of polymerization, the pH of the emulsion was adjusted to 9 with approximately 0.90 parts of a 28% ammonia solution.

0.03 parts of a bactericide and 1.44 parts of an aqueous ammoniacal solution (pH 9.0) containing 35% of a styrene-maleic anhydride copolymer were added.

The size range of the polymer beads so produced was estimated to be 1–10 micron and the size distribution curve was identical to FIG. 2.

The invention is illustrated by the following examples in which all parts are given by weight.

EXAMPLE 1

A paint according to the invention to be used as a tinting base was made using high speed dispersion equipment to the folowing formula:

| | Parts |
|---|---|
| white bead slurry, 10–40 micron | 35.6 |
| white bead slurry, 2–10 micron | 29.2 |
| ammonia solution (28% wt) | 0.5 |
| rutile titanium dioxide pigment | 13.0 |
| polymeric thickener | 0.8 |
| dispersant solution | 2.0 |
| coalescing agent | 0.4 |
| acrylic aqueous emulsion (50% solids, minimum filming temperature, 18° C., Tukon hardness 1.0% particle size approx. 0.2 micron) | 15.0 |
| water | 3.5 |

A suitable latex is, for example, "Rhoplex" AC-61 of Rohm and Haas Co., U.S.A. (Registered trademarks).

EXAMPLE 2

A paint according to the invention to be used as a tinting base was made, using high speed dispersion equipment to the following formula.

| | Parts |
|---|---|
| clear bead slurry, 10–40 micron | 32.0 |
| white bead slurry, 2–10 micron | 29.2 |
| ammonia solution (28%) | 0.5 |
| rutile titanium dioxide pigment | 13.0 |
| polymeric thickener | 0.8 |
| dispersant solution | 2.0 |
| coalescing agent | 0.4 |
| acrylic emulsion as in Example 1 | 15.0 |
| water | 7.1 |

The example was repeated, replacing on solids the acrylic emulsion by an emulsion of vinyl acetate polymer consisting of a copolymerized mixture of vinyl acetate and 2-ethyl hexylacrylate in the proportion by weight of 85/15.

EXAMPLE 3

A paint according to the invention to be used as a tinting base was made, using high speed dispersion equipment to the following formula.

| | Parts |
|---|---|
| clear bead slurry, 10–40 micron | 32.0 |
| clear bead slurry, 2–10 micron | 26.1 |
| ammonia (28%) | 0.5 |
| rutile titanium dioxide pigment | 13.0 |
| polymeric thickener | 0.8 |
| dispersant solution | 2.0 |
| coalescing agent | 0.4 |
| acrylic emulsion as in Example 1 | 15.0 |
| water | 10.2 |

EXAMPLE 4

Colors were tinted from the mar-resistant tint base of Example 1 and applied to a test panel by brushing. The dried films were examined for color uniformity and degree of hiding.

Using a tinter comprising a dispersion in a water-compatible medium of a phthalocyanine blue pigment, blue colors with a G reflectance (as hereinabove defined) of less than 60% were prepared. They showed an unacceptable degree of departure from color uniformity, evident both as streakiness in the direction of brushing and so-called "flip and flop" as hereinabove defined. All colors were judged to be of acceptable hiding power when compared with flat paints utilizing conventional technology.

Using a tinter comprising a dispersion in a water-compatible medium of a red iron oxide pigment pink colors with a G reflectance of less than 60% showed an unacceptable degree of flip. Tints of greater than 60% G reflectance were acceptable with regard to flip. All colors were of acceptable hiding power.

Using a tinter compsiring a dispersion in a water-compatible medium of a carbon black pigment, grey colors with a G reflectance less than 66% showed an unacceptable degree of flip. Tints of greater than 66% G reflectance were acceptable with regard to flip. All colors were of acceptable hiding power.

EXAMPLE 5

Colors were tinted from the mar-resistant tint base of Example 2 and applied to a test panel by brushing. The dried films were examined for "flip" and hiding power.

Using a phthalocyanine blue tinter, blue tints with a G reflectance less than 29% showed acceptable flip. Above a reflectance of 29%, the degree of flip was acceptable. Hiding power was judged to be unacceptably low for colors with G reflectances greater than 65%. Colors with G reflectances in the range of 29%–65% were acceptable with regard to both flip and hiding power.

Similar behavior was observed with other colored tinters.

EXAMPLE 6

Colors were tinted from the mar-resistant tint base of Example 3 and applied to a test panel by brushing. The dried film was examined for "flip" and hiding power.

No tinted colors from this tint base showed "flip". The hiding power was acceptable only for tints with G reflectances below 30%.

EXAMPLE 7

Demonstration of the effect of lowering the proportion of beads to below 55% of the total volume solids.

A paint suitable for use as a tinting base was made, using speed dispersion equipment to the following formula.

|  | Parts |
| --- | --- |
| clear bead slurry, 10–40 microns | 10.3 |
| clear bead slurry, 2–10 microns | 8.5 |
| ammonia (28%) | 0.5 |
| rutile titanium dioxide pigment | 13.0 |
| polymeric thickener | 0.8 |
| dispersant solution | 2.0 |
| coalescing agent | 0.4 |
| acrylic emulsion as in Example 1 | 15.0 |
| water | 0.9 |

In this tint base, the beads comprise 40% of the volume of the solids in contrast to the 67% of Example 3. The bead was tinted to give a G reflectance of below 30% as described in Example 6 and applied to a test panel by brushing. On examination, it was found that the panel exhibited a high degree of "sheeriness", a mottled appearance caused by the presence of glossy patches and streaks on the film. The panel of the tint base of Example 3 described in Example 6 did not show these defects.

EXAMPLE 8

Demonstration of the effect of altering the relative quantities of larger and smaller beads.

Two tint bases hereinafter referred to as (a) and (b) were prepared according to the method and using the materials and quantities of Example 3, with the exceptions that the quantities of beads used therein were substituted by the following quantities.

|  | (a) | (b) |
| --- | --- | --- |
| clear bead slurry, 10–40 micron | 22.5 | 41.7 |
| clear bead slurry, 2–10 micron | 34.6 | 18.6 |

The quantities of slurry comprise the same total volume of beads as the quantities used in Example 3, but in (a) the larger beads comprise 35% of the total volume of beads and, in (b), they comprise 65% of the total volume of beads. Both these lie outside the required larger bead volume of 45–55% of the total bead volume in contrast to Example 3 wherein the larger beads comprise 50% of the total volume of beads.

The two tint bases tinted as described in Example 6 and then brushed out on to panels. The film of the tinted base (a) showed unacceptable "sheeriness" and the base (b) had acceptable appearance but was very susceptible to marring and abrading. The tinted base of Example 3 did not exhibit either defect.

EXAMPLE 9

Preparation of a tint base utilizing a non-aqueous film-former.

While bead slurries of both 2–10 micron and 10–40 micron size ranges of beads were dried and the resultant dried beads mixed so that the beads of the 10–40 micron size range comprised 50% by volume of the mixed dried beads.

10 parts of rutile titanium dioxide were dispersed in 20 parts of a 40% solution in xylene of a soya bean oil/glycerol phthalate alkyd of 50% oil length. To this mixture, 5 parts of the dry polymer beads and 10 parts of xylene were added and the aggregates dispersed by sand-grinding the mixture. The resulting base was then filtered.

The base was tinted with a tinter comprising a dispersion of phthalocyanine blue in a xylene-compatible medium to give a range of tints and films of the paint so prepared were applied to test panels by brushing. It was found that blue colors with G reflectances of over 60% showed acceptable "flip" but those with G reflectances below this were unacceptable.

EXAMPLE 10

Comparison of tinted paints according to the present invention with tinted paints comprising beads of a single size distribution.

The paints comprising beads of a single size distribution were prepared according to the method of U.S. Pat. No. 3,839,253 — the actual paint used may be found under No. 6 in Table 3 (Columns 11 and 12). Samples of this paint were tinted with phthalocyanine blue tinter to reflectances of 20%, 50% and 70% and these were compared respectively with a tinted paint of reflectance 20% prepared from the tint base of Example 3, a tinted paint of reflectance 50% prepared from the tint base of Example 2 and a tinted paint of reflectance 70% prepared from the tint base of Example 1, all three being tinted with the same phthalocyanine blue tinter. In each case, the paint described under U.S. Pat. No. 3,839,253 exhibited unacceptable characteristics such as streakiness, flip or color variations, or a combination of these defects, whereas the corresponding paint according to the invention had a satisfactory appearance.

We claim:

1. A matt paint composition comprising pigment dispersed in a liquid paint vehicle, at least 55% but less than 90% by volume of the non-volatile content of the paint consisting of synthetic polymer beads, said polymer beads consisting essentially of two sets of beads, each set of beads being characterized in that it has a distribution of bead sizes such that a graph which plots particle size of beads against frequency of occurrence of a given bead size takes the form of a bell-shaped distribution curve, the peak of the curve representing the frequency of occurrence of the most frequently occurring bead size lying between the two extremes of the particle size range for each set, the first set consisting essentially of polymer particles in the size range 2–10 micron diameter and the second set consisting essentially of polymer particles in the size range 10–40 micron diameter, said beads being selected from the group consisting of clear beads and beads which are white and opaque and further characterized in that:
    (a) said beads of both size ranges are white and opaque when a film obtained by drying the paint has a reflectance above 65% the reflectance being the standard green reflectance denoted "G" in the American Society for Testing Materials method D2244-68;
    (b) said beads of the size range from 2 to 10 microns are white and opaque and the large beads are clear when a film obtained by drying the paint has a reflectance as hereinabove defined from 30% to 65%; (c) said beads of both size ranges are clear when a film obtained by drying the paint has a reflectance as hereinabove defined below 30%.

2. A matt paint composition according to claim 1 wherein the beads of the larger size range are solid and consist essentially of polymer having a maximum elongation at break of 40%.

* * * * *